(12) United States Patent
Fischbach et al.

(10) Patent No.: US 10,926,984 B2
(45) Date of Patent: Feb. 23, 2021

(54) METHOD FOR DRIVER ASSISTANCE FOR AN INDUSTRIAL TRUCK AND INDUSTRIAL TRUCK

(71) Applicant: Jungheinrich AG, Hamburg (DE)

(72) Inventors: Hennes Fischbach, Freising (DE); Lars Dohrmann, Hamburg (DE); Sebastian Rockel, Hamburg (DE)

(73) Assignee: Jungheinrich AG, Hamburg (DE)

( * ) Notice: Subject to any disclaimer, the term of this patent is extended or adjusted under 35 U.S.C. 154(b) by 171 days.

(21) Appl. No.: 16/168,989

(22) Filed: Oct. 24, 2018

(65) Prior Publication Data

US 2019/0119087 A1    Apr. 25, 2019

(30) Foreign Application Priority Data

Oct. 24, 2017 (DE) ..................... 10 2017 124 788.2

(51) Int. Cl.
*B66F 9/24* (2006.01)
*B62D 15/02* (2006.01)
(Continued)

(52) U.S. Cl.
CPC ............... *B66F 9/24* (2013.01); *B60K 28/02* (2013.01); *B60K 35/00* (2013.01); *B60R 1/00* (2013.01);
(Continued)

(58) Field of Classification Search
CPC ........ B66F 9/24; B66F 9/0755; B66F 17/003; B60K 28/02; B60K 35/00;
(Continued)

(56) References Cited

U.S. PATENT DOCUMENTS 9,612,123 B1 * 4/2017 Levinson .............. B60W 30/09
2001/0022616 A1    9/2001 Rademacher et al.
(Continued)

FOREIGN PATENT DOCUMENTS

DE        10012525 A1    9/2001
DE    102007063226 A1 *  7/2009 ............... B60R 1/00
(Continued)

OTHER PUBLICATIONS

Jonathan et al., "Reconstruction of Background Radiation Emissivity of Urban Structures Using a Truck-Based Detector Array," 2015, Publisher: IEEE.*

(Continued)

*Primary Examiner* — Tuan C To
(74) *Attorney, Agent, or Firm* — Rankin, Hill & Clark LLP

(57) ABSTRACT

A method for providing driver assistance for an industrial truck and an industrial truck, particularly a forklift, including capturing steering movement of a steering device of the industrial truck, capturing images of at least part of a surrounding area of the industrial truck using at least one camera, superimposing both a travel path of contours of the industrial truck and a travel path of contours of a load transported on the industrial truck corresponding to the captured steering movement on the captured images, and displaying the captured images having the superimposed travel paths of contours of the industrial truck and the load transported on the industrial truck on a display device disposed in a region of a driver's position of the industrial truck. The contours of the load are obtained from a measurement system of the industrial truck or from virtual models of loads stored in an image processing device.

17 Claims, 3 Drawing Sheets

(51) Int. Cl.
*B66F 17/00* (2006.01)
*B60K 28/02* (2006.01)
*B60K 35/00* (2006.01)
*B60W 50/04* (2006.01)
*B66F 9/075* (2006.01)
*B60R 1/00* (2006.01)

(52) U.S. Cl.
CPC ....... *B60W 50/045* (2013.01); *B62D 15/0295* (2013.01); *B66F 9/0755* (2013.01); *B66F 17/003* (2013.01); *B60K 2370/21* (2019.05); *B60K 2370/782* (2019.05); *B60R 2300/305* (2013.01); *B60Y 2200/15* (2013.01)

(58) Field of Classification Search
CPC B60K 2370/782; B60K 2370/21; B60R 1/00; B60R 2300/305; B60W 50/045; B62D 15/0295
USPC .......................................................... 701/36
See application file for complete search history.

(56) References Cited

U.S. PATENT DOCUMENTS

| | | | | |
|---|---|---|---|---|
| 2014/0085472 | A1* | 3/2014 | Lu | B60R 1/00 348/148 |
| 2014/0139676 | A1* | 5/2014 | Wierich | H04N 5/23296 348/148 |
| 2014/0205403 | A1* | 7/2014 | Criswell | B65G 67/24 414/395 |
| 2014/0253722 | A1* | 9/2014 | Smyth | H04N 5/23296 348/135 |
| 2015/0353095 | A1* | 12/2015 | Freess | B60C 9/00 701/41 |
| 2016/0082886 | A1* | 3/2016 | Jeong | B60R 1/00 348/118 |
| 2016/0121723 | A1 | 5/2016 | Fitch et al. | |
| 2016/0138248 | A1 | 5/2016 | Conway et al. | |
| 2016/0138249 | A1* | 5/2016 | Conway | E02F 9/261 701/50 |
| 2016/0189443 | A1* | 6/2016 | Smith | G06K 9/00838 701/29.1 |
| 2017/0132934 | A1* | 5/2017 | Kentley | G08G 1/202 |
| 2017/0212517 | A1* | 7/2017 | Houle | B60W 50/14 |
| 2017/0272664 | A1* | 9/2017 | Lang | B60R 1/12 |
| 2018/0016124 | A1* | 1/2018 | Keller | B66F 9/0755 |
| 2018/0370432 | A1* | 12/2018 | Imaizumi | B60R 11/00 |
| 2019/0072403 | A1* | 3/2019 | Sakai | G01S 13/876 |
| 2019/0196472 | A1* | 6/2019 | Korner | G05D 1/0088 |
| 2019/0210525 | A1* | 7/2019 | Laclef | B62D 15/0295 |
| 2019/0302794 | A1* | 10/2019 | Kean | G05D 1/0246 |
| 2019/0369391 | A1* | 12/2019 | Cordesses | A63F 13/213 |
| 2020/0001790 | A1* | 1/2020 | Ling | B62D 15/0285 |
| 2020/0293062 | A1* | 9/2020 | Ogihara | G05D 1/0278 |

FOREIGN PATENT DOCUMENTS

| | | | | |
|---|---|---|---|---|
| DE | 102007063226 | A1 | 7/2009 | |
| DE | 102010028911 | A1 * | 11/2011 | ......... B62D 15/0265 |
| EP | 3020868 | A1 | 5/2016 | |
| JP | 09294412 | A * | 11/1997 | ............... E02F 9/26 |
| JP | 11148833 | A * | 6/1999 | |
| JP | 11322294 | A * | 11/1999 | |
| JP | 2012051678 | A | 3/2012 | |
| JP | 2014239357 | A | 12/2014 | |
| KR | 101196999 | B1 * | 11/2012 | |
| WO | WO-2012117693 | A1 * | 9/2012 | ............ B60R 1/003 |

OTHER PUBLICATIONS

Claire et al, "Rational Truck Driving and Its Correlated Driving Features in Extra-Urban Areas," 2014, Publisher: IEEE.*
Vicent et al., "Continuous-Curvature Kinematic Control for Path Following Problems," 2011, Publisher: IEEE.*
Misawa et al., "The Proposal of the Forklift Fall Accidents Prevention Method Using Sliding Mode Control," 2015, Publisher: IEEE.*
Youtube Video: Gabelstapler 2014—Gabelstabler-Simulator 2014 [PC] [Gameplay] [German][HD]; Youtube, Aug. 20, 2013; https://youtube.com/watch?v=qPEywCDf2hM, retrieved on Sep. 11, 2018.

* cited by examiner

METHOD FOR DRIVER ASSISTANCE FOR AN INDUSTRIAL TRUCK AND INDUSTRIAL TRUCK

PRIORITY CLAIM

This application claims priority to German Patent Application No. DE 10 2017 124 788.2, filed Oct. 24, 2017.

BACKGROUND OF INVENTION

Field of Invention

The invention relates to a method for driver assistance for an industrial truck and a corresponding industrial truck, particularly a forklift, comprising a steering device and a surrounding area display system having at least one camera, an image processing device, and a display device disposed in the region of a driver's position of the industrial truck, a steering movement of the steering device being captured and images of at least part of the surrounding area of the industrial truck being captured by the at least one camera, and a travel path of the industrial truck corresponding to the captured steering movement being superimposed on the captured images, and the images having the superimposed travel path being displayed on the display device.

Brief Description of Related Art

From DE 10 2007 063 226 A1, a method is known for driver assistance for an industrial truck comprising a steering device having sensors for capturing the steering movement of the steering device and comprising a driver's position and a display device disposed in the region of the driver's position. DE 10 2007 063 226 A1 is thereby based on display systems commonly present in industrial trucks for showing the driver's perspective and in which assistance occurs partially during forward travel, for example when large and bulky loads are transported and prevent a direct forward view by the driver. Forklifts often travel in reverse, not only for maneuvering, but also for transport travel. With a camera system for reverse travel, the need is eliminated for the driver to turn the head, as would otherwise be necessary during the entire reverse travel in conventional forklifts.

Assistance to the driver is improved according to DE 10 2007 063 226 A1 in that the steering movement is captured by the sensor and a potential travel path of the industrial truck with reference to the longitudinal axis thereof as determined by the steering movement is calculated by a calculating unit, and the travel path is shown on the display device.

BRIEF SUMMARY OF THE INVENTION

The object of the present invention, in contrast, is to assist the driver during maneuvering and to make operating the industrial truck safer and faster.

The object is achieved by a method for driver assistance for an industrial truck, particularly a forklift, comprising a steering device and a surrounding area display system having at least one camera, an image processing device, and a display device disposed in the region of a driver's position of the industrial truck, a steering movement of the steering device being captured and images of at least part of the surrounding area of the industrial truck being captured by the at least one camera, and a travel path of the industrial truck corresponding to the captured steering movement being superimposed on the captured images, and the images having the superimposed travel path being displayed on the display device, refined in that a travel path of a load transported on the industrial truck and corresponding to the captured steering movement is superimposed over captured images and displayed.

The fundamental idea of the invention is that the travel path displays of the known systems relate only to the fixed contour of the vehicle, and not to the potential load present on the forks. If the load is even visible at all in the display, the problem arises that in general objects extending above the plane of the floor are distorted in the display. Loads therefore appear much larger in corresponding images than said loads actually are. In the display of the surrounding area in front of the vehicle, a load appears distorted in the image. The actual end of the load cannot be reliably estimated by means of the known system.

The solution according to the invention now makes it possible to display the surrounding area of the industrial truck and the expected travel path of the load on a display device, for example in a plan view or an oblique view. The very unreliable evaluation of the length and dimensions of the load by the driver is replaced in this case by a reliable calculation. The underlying geometric calculation methods do not differ from the state of the art. The previous fixed contours of the vehicle, however, are supplemented by the corresponding contours of the load.

In one aspect of the invention, a load or a plurality of various loads is or are stored in the image processing device as a virtual model of a load, particularly a Euro-pallet transported lengthwise or crosswise, or virtual models of various loads having prescribed dimensions, wherein a driver of the industrial truck particularly selects the load and/or the orientation thereof on the industrial truck. A frequently occurring case is that of a Euro-pallet, the outer dimensions of which are standardized, said pallet being transportable either lengthwise or crosswise on the forks of the forklift or industrial truck. In most cases, the load on the Euro-pallet is packaged so as not to protrude beyond the Euro-pallet.

If a load is, particularly additionally, measured by means of a measurement system and the travel path corresponding to the steering movement is calculated in the image processing device using results of the measurement, then a very efficient and model-independent refinement of the method is achieved. To this end, the industrial truck is equipped with a measurement system for measuring the load either outside of or on the industrial truck, for example based on a plurality of cameras, and the corresponding measurement data is made available to the image processing device.

In a further aspect of the invention, the travel paths of the industrial truck and the load are superimposed on a representation of the surrounding area in the direction of motion of the industrial truck. It is thereby possible that only that part of the travel path of the load extending beyond the travel path of the industrial truck is shown. A side boundary thus results, for example, which is displayed on the right side of the travel path of the industrial truck itself for a left curve, for example, and on the left side of the travel path for a right curve, because the load protrudes beyond the travel path of the industrial truck on the outer side of the curve in each case.

One aspect of the invention for the display is that the 360° surrounding area or a part of the surrounding area of the industrial truck is shown from above from a bird's-eye view or an oblique view. This is done particularly in addition to or switchable from a representation from the driver's view.

An example of a system by means of which a bird's-eye view is shown is Bosch's SURROUND VIEW™ system. Said system uses a plurality of close-range cameras and a common image from a bird's-eye view is calculated from the image streams thereof. An oblique view is understood, for example, to mean a representation known from modern navigation device, wherein the point of view is a bird's-eye view located obliquely behind the vehicle and directed obliquely forward and downward, so that the vehicle is in the field of view.

In a further aspect of the invention, the industrial truck and/or the load is or are superimposed on the images captured by the at least one camera as a virtual model of the industrial truck or as a virtual model of the load. The load is advantageously shown virtually, supported on the forks of the virtual representation of the industrial truck. The representation of the industrial truck and/or of the load as a virtual model in each case can be a fixed setting or switchable. The driver of the industrial truck is thereby provided with an easily understandable spatial reference for its own location and the dimensions of the moving objects.

In a further aspect of the invention, virtual models of one or more accessories for the industrial truck can be selected or defined by a driver or a service technician. Without limiting the selection and the scope of protection of the invention, the following are listed purely as examples of corresponding accessories: refrigerator clamps, paper mandrels with or without paper rolls, long goods, variable beverage clamps, side shifters, fork adjusters, multi-pallet devices, rotating devices, fork clamps, bale clamps, retractable forks, drum clamps, load guards, and/or crane arms.

According to a further aspect of the invention, for accessories adjustable during travel, a current position and/or orientation is or are captured by means of at least one sensor or at least one camera and considered in the calculation of the travel path. This can also be incorporated in the display.

For an industrial truck having side shifters, the virtual model of the load is advantageously shifted as well when calculating the travel path. Alternatively or additionally, the virtual model of the load is shown in a center position and/or in an extreme left and/or extreme right position. This display as well can preferably be switched on and off. The load on the forks can be shifted left and right by means of a side shifter. In this respect, when calculating the travel path and the representation of the virtual load, it is advantageous to dynamically shift or modify said load according to the side shifter position. If the position of the side shifter is unknown, the load with the travel path can be shown in the display in the center position, as well as in the case that the load is shifted to the maximum left or right position. Because the driver typically travels with the side shifter in the center, and the side shifter is used only for placing loads into storage, said display can also be switched off in a variant.

Furthermore, a variable spacing between a mast and a back end of a fork of the industrial truck is preferably considered in the calculation of the travel path of the load.

Further relief of the driver is achieved if a load is displayed virtually in the displayed image only if a load sensor detects the load.

The object of the invention is also achieved by an industrial truck, particularly a forklift, having a steering device and a surrounding area display system having at least one camera, an image processing device, and a display device disposed in the region of a driver's position of the industrial truck, the steering device comprising a sensor for capturing a steering movement and the surrounding area display system being configured for capturing images of at least part of the surrounding area of the industrial truck by means of the at least one camera, and for superimposing a travel path of the industrial truck corresponding to the captured steering movement onto the captured images in the image processing device, and for displaying the images having the superimposed travel path on the display device, refined in that the image processing device is configured and set up for superimposing a travel path of a load transported on the industrial truck corresponding to the captured steering movement over the captured images and displaying the same on the display device.

The industrial truck according to the invention implements the same features, properties, and advantages as the method according to the invention described above.

According to one aspect of the invention, a measurement system is included by means of which measurement data for a load can be captured, wherein the image processing device is configured and set up for using the measurement data of the load for calculating the travel path of the load.

In a further aspect of the invention, the surrounding area display system is configured and set up for showing a virtual model of the industrial truck and/or a virtual model of the load in the displayed image, wherein the representation of the travel path of the load, of the virtual model of the industrial truck, and/or of the virtual model of the load can be switched on and off.

In a further aspect of the invention, the industrial truck and the surrounding area display system are configured and set up for performing a previously described method according to the invention. To this end, the industrial truck and the surrounding area display system are equipped with corresponding measurement and control devices necessary or helpful for performing the method. The industrial truck particularly comprises sensors for monitoring the position and/or orientation of accessories and/or of the load. Alternatively or in addition, the surrounding area display system comprises selectable virtual models of one or more various loads and/or accessories, or is configured and set up for entering dimensions of a load not yet registered. The industrial truck and the surrounding area display system are thus equipped and set up for implementing the method according to the invention and thus for implementing all features, advantages, and properties of the same.

Further feature of the invention are disclosed by the description of embodiments according to the invention, together with the claims and the attached drawings. Embodiments according to the invention can fulfill individual features or a combination of a plurality of features.

BRIEF DESCRIPTION OF THE DRAWINGS

The invention is described below, without limiting the general idea of the invention, using embodiment examples with reference to the drawings, wherein reference is made expressly to the drawings with respect to all details not explained further in the text. In the drawings.

DETAILED DESCRIPTION OF THE INVENTION

Figure 4:
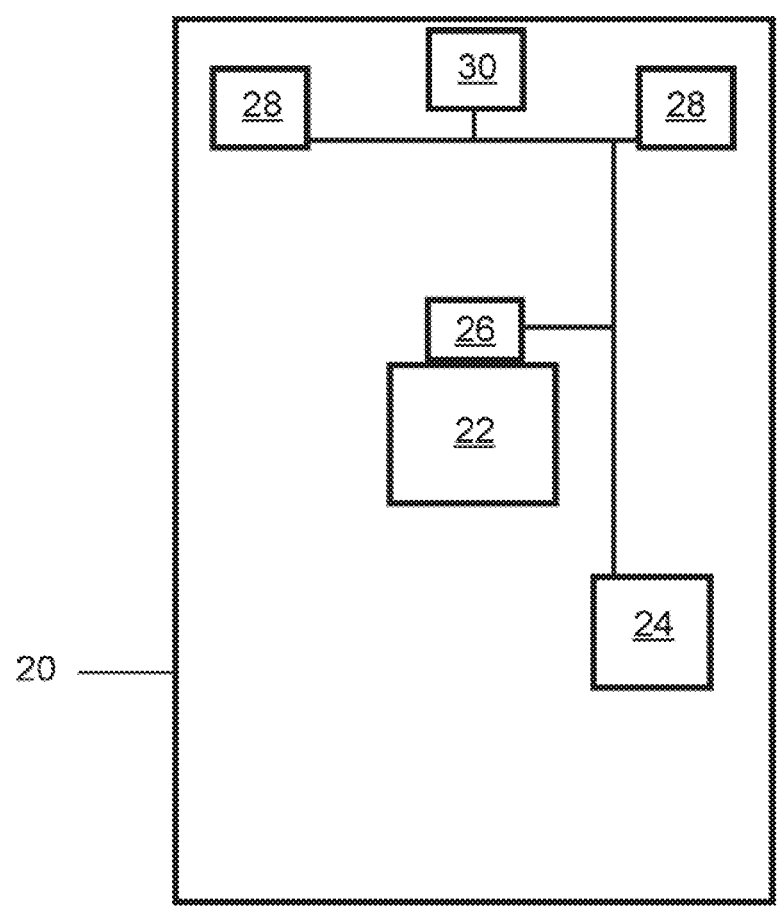

FIG. 4 shows a labeled representation of an industrial truck 20 having a steering device 22, image processing device 24, sensor for capturing steering movement 26, sensors for monitoring the position and/or orientation of accessories 28 and a measurement system 30.

Figure 1:
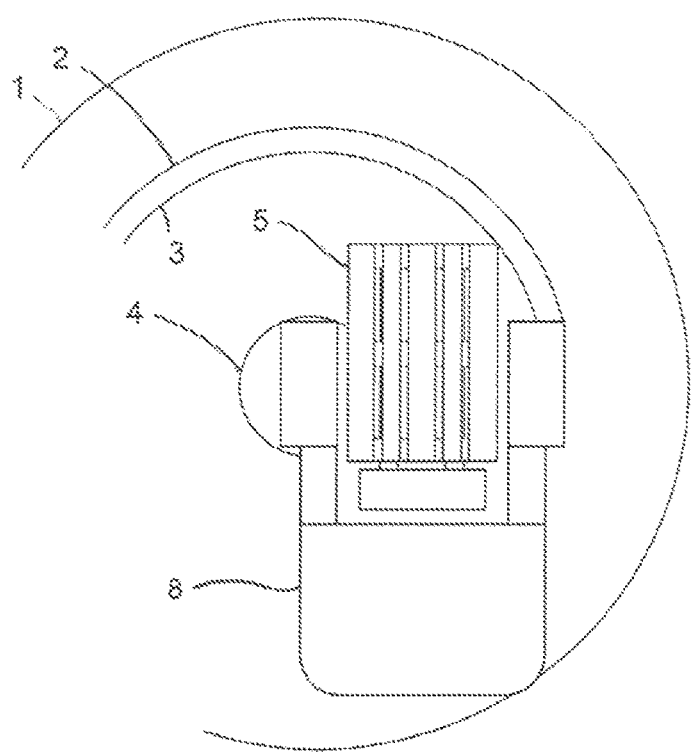
FIG. 1 A schematic representation of a driving situation from a bird's-eye view, FIG. 2 A schematic representation of a further driving situation in a bird's-eye view, FIG. 3A-3C Schematic representations of calculated travel paths from a driver's perspective, and FIG. 4 A labeled representation of an industrial truck having a steering device, image processing device, sensor for capturing steering movement, sensors for monitoring the position and/or orientation of accessories and a measurement system.
Figure 2:
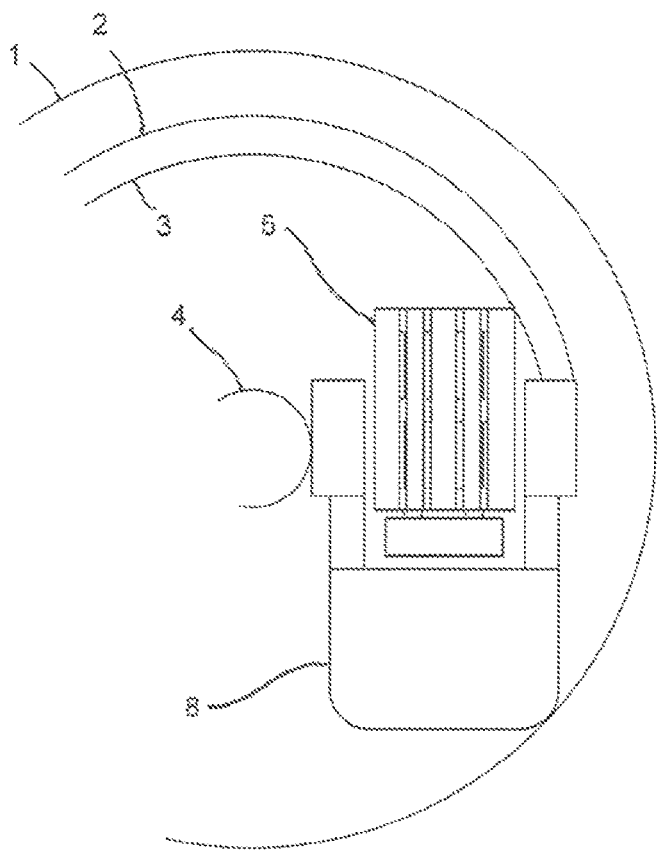

FIGS. 1 and 2 show a schematic representation of a driving situation in a bird's-eye view, as would be shown in a SURROUND VIEW™ system when an industrial truck is equipped with a plurality of close-range cameras by means of which the surrounding area of the industrial truck is recorded in all directions. In this case, a virtual model 8 of the industrial truck is shown with a virtual model 5 of a load, in this case a Euro-pallet being transported on the left. Said pallet is present on tines, shown only schematically, of the transport fork of the industrial truck. Various travel paths are superimposed on the image, namely a travel path 1 for the rear of the vehicle, a travel path 2 for the front of the right arm of the vehicle, and additionally a load travel path 3 for the load 5. The vehicle travel path 4 of the inside front edge of the vehicle is also shown. The representations in FIGS. 1 and 2 thereby differ by the selected steering movement and the fact that the industrial truck in the case of FIG. 1 is rotating about the left front wheel, while in FIG. 2 the center of the travel path is outside of the vehicle.

As can be seen in FIGS. 1 and 2, particularly in tight maneuvering situations, the case can arise that the industrial truck first encounters a boundary with a load, before a part of the vehicle itself makes contact with a wall or other object. The representation shown in FIGS. 1 and 2 can additionally or alternatively be displayed from a different perspective view, such as an oblique view from behind and above, looking forward and downward, or from a driver's perspective.

Figure 3A:
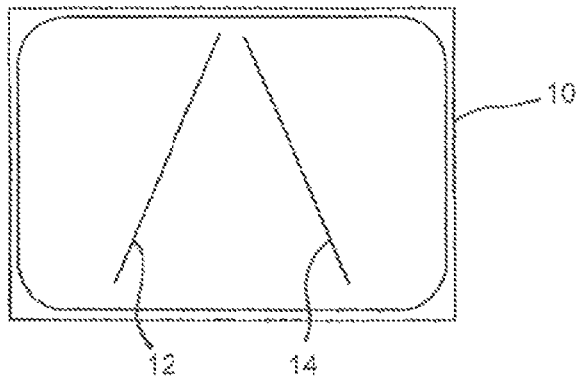
Figure 3B:
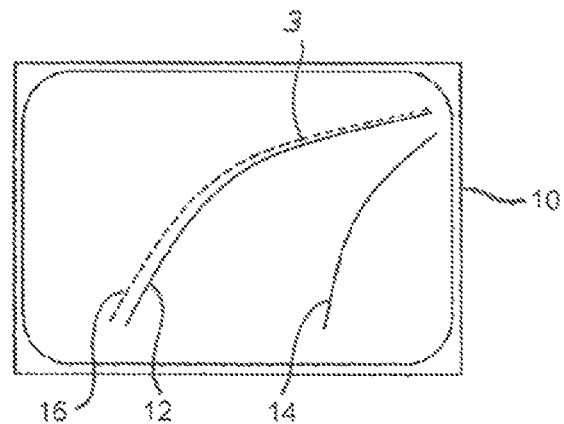
Figure 3C:
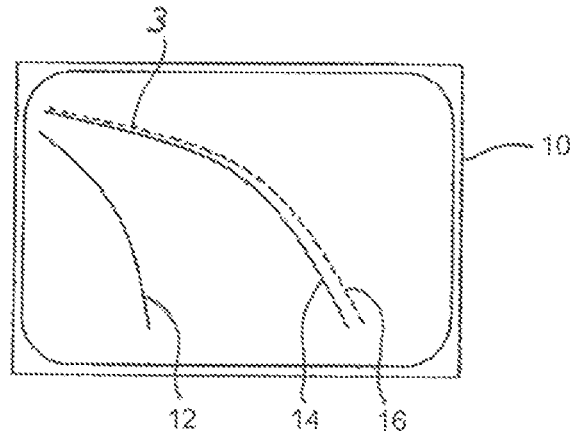

FIGS. 3A, 3B, and 3C show schematic representations of implementations on a display device 10 from a driver's perspective. For a steering movement of 0°, according to FIG. 3A, a left vehicle travel path 12 and a right vehicle travel path 14 result, converging in the distance in a perspectively correct manner. For a steering movement to the right, as shown in FIG. 3B, a distorted in perspective, curved path of the left and right vehicle travel paths 12, 14 results, wherein a load travel path 16 is additionally shown at the outside, wherein in this case the load is overhanging so as to protrude beyond the left travel path 12. In comparison therewith, the reverse case of a steering movement to the left is shown in FIG. 3C, where the load travel path 16 protrudes beyond the right vehicle travel path 14 at the outside, that is, on the right. In this respect, the load does not correspond to that from FIGS. 1 and 2, in that the travel path of the load relative to the travel path 2 of the vehicle is shifted inward and not outward at the front of the wheel arm in the first figures.

In the driver's perspective of FIGS. 3A through 3C, neither the vehicle nor the load can be seen as a virtual model. It is possible to show the load, for example as a wireframe model or as a semitransparent model. It is also possible to show the front edge of the load in the display, for example, in order to make it possible for the driver to estimate how far the vehicle may still travel before the load strikes an obstacle. This can also be achieved by means of auxiliary lines.

All features indicated, including those found alone in the drawings, and all features, including individual features, disclose in combination with other features, are considered to be essential to the invention both alone and in combination. Embodiments according to the invention can be fulfilled by individual features or a combination of a plurality of features. Features labeled as "particularly" or "preferably" within the invention are understood to be optional.

REFERENCE LIST

1 Travel path of rear of vehicle
2 Travel path of front wheel arm
3 Travel path of load
4 Travel path of front inside edge
5 Virtual model of the load
8 Virtual model of the industrial truck
10 Display device
12 Travel path of left side of vehicle
14 Travel path of right side of vehicle
16 Travel path of load
20 Industrial truck
22 Steering device
24 Image processing device
26 Sensor for capturing a steering movement
28 Sensors for monitoring the position and/or orientation of accessories
30 Measurement system

What is claimed:

1. A method for providing driver assistance for an industrial truck having a steering device and a surrounding area display system having at least one camera, an image processing device, and a display device disposed in a region of a driver's position of the industrial truck, the method comprising:
    capturing a steering movement of the steering device;
    capturing images of at least part of a surrounding area of the industrial truck using the at least one camera;
    superimposing both a travel path of contours of the industrial truck and a travel path of contours of a load transported on the industrial truck corresponding to the captured steering movement on the captured images; and
    displaying the captured images having the superimposed travel path of the contours of the industrial truck and the superimposed travel path of the contours of the load transported on the industrial truck on the display device;
    wherein the contours of the load transported on the industrial truck superimposed on the captured images and displayed on the display device are obtained from measurements of the load made by a measurement system of the industrial truck or from a virtual model of a load stored in the image processing device.

2. The method according to claim 1, wherein the industrial truck is a forklift.

3. The method according to claim 1, wherein the virtual model of the load is selectable by the driver from a plurality of various loads stored in the image processing device.

4. The method according to claim 1, wherein an orientation of the virtual load on the industrial truck is selectable by the driver.

5. The method according to claim 1, wherein the travel paths of the industrial truck and the load displayed on the display device are superimposed on a representation of the surrounding area in a direction of motion of the industrial truck.

6. The method according to claim 5, wherein all or part of the surrounding area of the industrial truck displayed on the display device is:
   switchably shown from above from a bird's-eye view or from an oblique view, or
   simultaneously shown both from above from the bird's-eye view and from the oblique view.

7. The method according to claim 1, wherein one or both of a virtual model of at least a portion of the industrial truck and the virtual model of the load is superimposed on the captured images displayed on the display device, and wherein the virtual model of the load is shown supported on the virtual model of the industrial truck.

8. The method according to claim 1, wherein a virtual model of one or more accessories for the industrial truck is stored in the image processing device and is selectable by the driver or by a service technician for display on the display device.

9. The method according to claim 8, wherein the virtual model of one or more accessories is selected from a group consisting of refrigerator clamps, paper mandrels with or without paper rolls, long goods, variable beverage clamps, side shifters, fork adjusters, multi-pallet devices, rotating devices, fork clamps, bale clamps, retractable forks, drum clamps, load guards and crane arms.

10. The method according to claim 8, wherein for an accessory that is adjustable during travel, a current position and/or orientation of said accessory is captured by at least one sensor or the at least one camera and considered in a calculation of a travel path thereof displayed on the display device.

11. The method according to claim 1, wherein for an industrial truck having side shifters, the travel path of the virtual model of the load displayed on the display device is shown from one or more of a center position, an extreme left position, and an extreme right position, and wherein the position shown on the display device is switchable on and off.

12. The method according to claim 11, wherein a variable spacing between a mast and a back end of a fork of the industrial truck is considered in the calculation of the travel path of the load displayed on the display device.

13. The method according to claim 1, the virtual load is displayed on the display device only if a load sensor detects that an actual load is present on the industrial truck.

14. An industrial truck comprising:
   a steering device;
   a surrounding area display system having at least one camera;
   an image processing device; and
   a display device disposed in region of a driver's position of the industrial truck;
   wherein the steering device comprises a sensor for capturing a steering movement,
   wherein the surrounding area display system is configured to capture images of at least part of a surrounding area of the industrial truck using the at least one camera,
   wherein the image processing device is configured to superimpose a travel path of contours of the industrial truck corresponding to the captured steering movement onto the captured images for display on the display device,
   wherein the image processing device is also configured to superimpose a travel path of contours of a load transported on the industrial truck corresponding to the captured steering movement on the captured images for display on the display device, and
   wherein the image processing device is configured to obtain the contours of the load transported on the industrial truck superimposed on the captured images for display on the display device from measurements of the load made by a measurement system of the industrial truck or from a virtual model of a load stored in the image processing device.

15. The industrial truck according to claim 14, wherein the surrounding area display system is configured to display one or both of a virtual model of the industrial truck and a virtual model of the load on the captured images displayed on the display device.

16. The industrial truck according to claim 15, wherein the travel path of the load, the virtual model of the industrial truck and the virtual model of the load are selectively switchable on and off for display on the display device.

17. The industrial truck according to claim 14, wherein the industrial truck and the surrounding area display system are configured to perform a method comprising:
   capturing the steering movement of the steering device;
   capturing images of at least part of the surrounding area of the industrial truck using the at least one camera;
   superimposing the travel path of the contours of the industrial truck and the travel path of contours of the load transported on the industrial truck corresponding to the captured steering movement on the captured images; and
   displaying the captured images having the superimposed travel path of the contours of the industrial truck and the superimposed travel path of the contours of the load transported on the industrial truck on the display device;
   wherein the industrial truck further comprises sensors for monitoring the position and/or orientation of accessories, or the image processing device comprises selectable virtual models of one or more accessories, or the image processing device is configured to permit entry of dimensions of accessories.

* * * * *